Dec. 17, 1957 C. R. TEMP 2,816,794
VEHICLE BODY ASSEMBLY
Filed Jan. 31, 1955 2 Sheets-Sheet 1
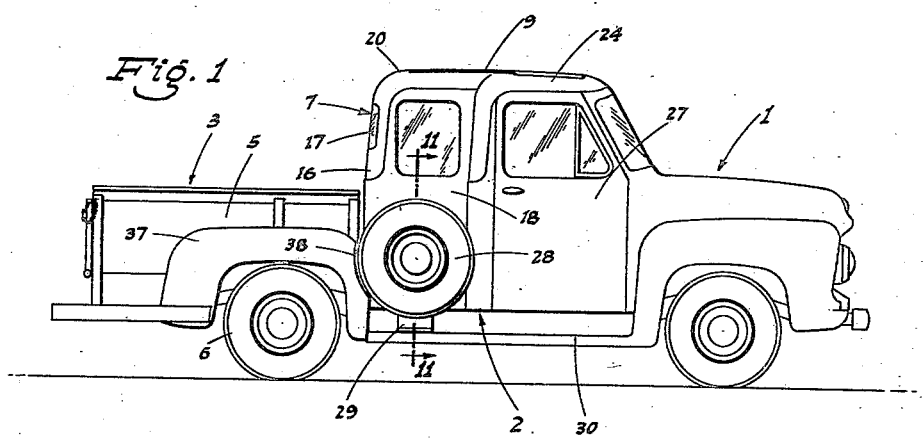
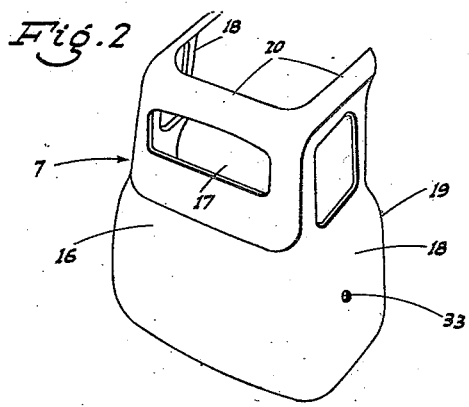
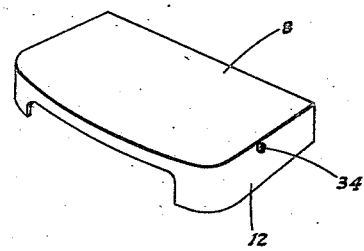
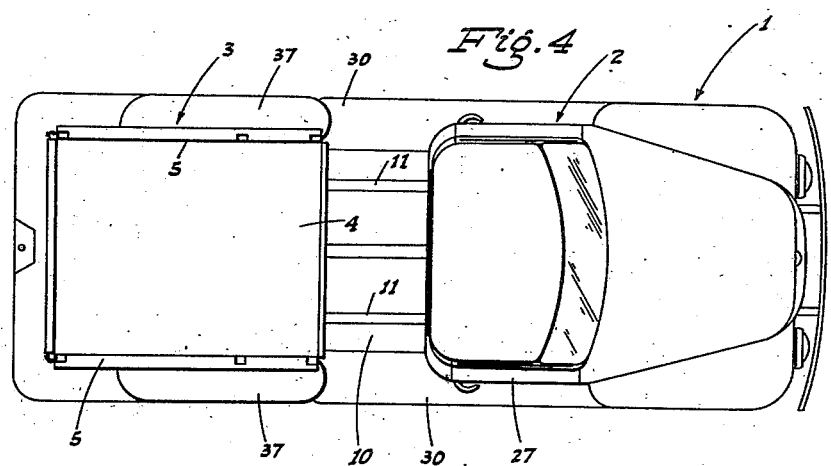
INVENTOR
Conrad R. Temp
BY Webster & Webster
ATTYS.

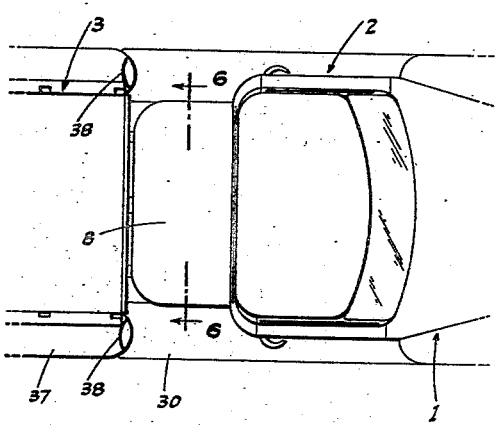

United States Patent Office 2,816,794
Patented Dec. 17, 1957

2,816,794

VEHICLE BODY ASSEMBLY

Conrad R. Temp, Sacramento, Calif.

Application January 31, 1955, Serial No. 485,047

2 Claims. (Cl. 296—28)

This invention relates to motor vehicle bodies, and particularly to the bodies of what are commonly called "pick-up trucks." Such trucks include an open load-carrying bed at the back, and a single-seat cab immediately in front of the bed.

However, in many instances it is desired to transport more passengers in this type of truck than is possible in the conventional single-seat cab.

It is therefore the major object of my invention to convert the single-seat cab of a pick-up truck, by means of a cab or body extension, into a full two-seat body, without altering the wheel base of the truck and without an excessive reduction of the load-carrying area of the truck.

A further object of the invention is to arrange the body extension so as to leave room at the sides thereof for a pair of spare tires—one on each side—without such tires increasing the overall width of the truck; and to provide means to mount these tires on the vehicle at the sides of said body extension without imposing any load or strain on the same.

Still another object of the invention is to provide a vehicle body assembly which is designed for ease and economy of manufacture.

It is also an object of the invention to provide a practical and reliable vehicle body assembly, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of a pick-up truck as converted and equipped with the cab or body extension, and the spare tires.

Fig. 2 is a rear perspective view of the cab or body extension member, detached.

Fig. 3 is a perspective view of the extension floor member for the body extension, detached.

Fig. 4 is a plan view of the truck, showing the load carrying bed after being cut back to receive the body extension.

Fig. 5 is a similar but fragmentary plan view, showing the extension floor member mounted between the cab and bed.

Fig. 6 is a cross section on line 6—6 of Fig. 5.

Fig. 7 is a fragmentary sectional plan of the original cab, and the body extension member as initially arranged in connection therewith.

Fig. 8 is a similar view, but shows the back of the cab as cut away and being fitted against the forward edge of the body extension member.

Fig. 9 is a fragmentary plan view showing the conversion operation completed except for the mounting of the roof or top panel thereon.

Fig. 10 is a plan view of said top panel, detached.

Fig. 11 is a fragmentary transverse section on line 11—11 of Fig. 1.

Referring now more particularly to the drawings, and to the characters of reference marked thereon, a conventional pick-up type truck 1, the passenger-carrying body of which I convert from a single to a two-seat structure, includes a cab 2, and a load carrying unit 3 which extends rearwardly from immediately behind the cab; said load carrying unit having a bed 4 and upstanding sides 5. The rear wheels 6 of the truck 1 are located intermediate the ends of said load carrying unit 3.

The essential parts of the conversion structure comprise a preformed body extension member 7 somewhat narrower than the cab 2, an extension floor member 8, and a roof or top panel 9; these parts being of sheet metal suitably pressed to shape.

In order to assemble these parts on the truck the unit 3 is first cut away from the cab 2 back a distance slightly greater than the length of the floor member 8, as shown at 10, and which exposes the adjacent portions of the longitudinal frame beams 11 of the truck. Said member 8, which includes a depending edge skirt 12, is then mounted in the cut-away area in a manner which depends on the make of vehicle which is being converted.

In the present instance the main floor portion and the cab 2 are mounted in floatable relation to the beams 11, and hence the floor member 8 is mounted in a similar manner. To this end a cross bar 13 is secured on the under side of the floor member 8, and links 14 connect the bar at its ends to brackets 15 projecting from the sides of beams 11; the floor member 8 being thus held clear of said beams 11, as shown in Fig. 6. The front edge of the floor member 8 is welded to the rear edge of the original body floor, so that the latter and said floor member 8 form a rigid unit.

After the floor member 8 is thus mounted, the body extension member 7 may then be mounted on said floor member 8 and connected to the cab 2. It should here be noted that said member 7 is contoured to conform to the shape and styling of the cab 2, and is the same height as the cab, while being somewhat narrower, as previously stated. Said member 7 comprises a back 16 having the usual window 17 therein, windowed side panels 18 whose forward edges 19 are cut to follow the contour of the back of the cab 2, and a relatively short, inwardly turned top flange 20 extending about the upper edge of the side and back panels.

Said member 7 is secured about its lower edge on the floor member 8, with the forward side edges 19 in contact with the back of the cab 2, as shown in Fig. 2. The back panel of the cab is then cut out and removed, the cut being made along side lines a short distance laterally inward of the points of engagement of the edges 19 therewith to leave flanges inwardly of panels 18, one of which flanges is shown at 21 in Fig. 8. Said flanges are then bent back against the panels 18, as shown at 22 in Fig. 8, and the overlapped metal parts are then welded together as indicated at 23.

In connection with the cutting out of the back panel of the cab, the roof thereof is also cut out, except for an inwardly projecting edge flange 24, as shown in Fig. 9, and which flange is arranged so as to be a continuation of the top flange 20 of member 7, as shown. The roof or top panel 9, which is of a shape symmetrical to but slightly larger than the open area outlined by flanges 20 and 24 is then supported on said flanges over the open top area, and is welded in place; the entire outside surface being then suitably finished and painted.

The interior of the enlarged body area is then suitably upholstered; the back section—within member 7—being fitted with a full width seat and back unit 25, while the usual rigid seat-back of the cab is replaced by a pair of forwardly tiltable backs 26 such as are used in conventional two-door sedans, and which enables riders to have access to the rear seat 25 from the one pair of doors 27 of the cab.

Spare tire and wheel units 28, one on each side, are also mounted on the vehicle in close association with the sides of member 7, but separate therefrom, in the following manner:

On each side of the vehicle an upright 29 is secured on the adjacent running board 30 and supports outwardly projecting wheel engaging elements 31. The upright 29 is braced by a diagonal rod 32 extending downwardly through a hole 33 in the adjacent side panel 18 and a suitably alined hole 34 in skirt 12 to a bolting connection 35 with the adjacent frame beam 11. A stiffening tube 36 is disposed about the rod between the panel 18 and skirt 12, and is welded thereto.

As shown in Fig. 9, the spare tire and wheel units fit snugly in the lateral recesses formed between the cab 2 and the rear wheel fenders 37; the latter at the front being actually indented somewhat, as shown at 38, so as to clear the spare tire units 28.

The above described vehicle body assembly, as incorporated in a pick-up truck, is extremely practical and useful in that a larger number of passengers than usual can be transported, while at the same time a substantial load of material can be carried on the bed. A pick-up truck provided with such vehicle body assembly is especially desirable for use by farmers, campers, fishermen or hunters, and utility crews. As an example, pick-up trucks are frequently used by line or repair crews of utility companies and the like, and in many instances not all of the members of the crew can occupy the cab while going to and from a job; other members having to ride on the open bed, which—in winter or inclement weather—is hardly conducive to comfort or good health. With the present invention all of the crew can ride within the extended cab-body.

From the foregoing description it will be readily seen that there has been produced such a structure as will substantially fulfill the objects of the invention, as set forth herein.

While this specification sets forth in detail the present and preferred construction of the structure, still in practice such deviations therefrom may be resorted to as do not form a departure from the spirit of the invention, as defined by the appended claims.

Having thus described the invention, the following is claimed as new and useful, and upon which Letters Patent are desired:

1. The method of enlarging the passenger-carrying body of a pick-up truck which includes a cab, and a load carrying bed extending rearwardly from the cab; said method comprising the steps of cutting away the bed for a predetermined distance back from the cab, mounting a floor in the cut-away area, mounting a preformed open-front body member on said floor with its forward side edges in engagement with the back of the cab adjacent the sides thereof, cutting out the back of the cab so as to leave vertical flanges inwardly of the sides of said body member, bending back such flanges against the inner face of said sides, and securing the bent flanges against such sides.

2. The method of enlarging the passenger-carrying body of a pick-up truck which includes a cab, and a load carrying bed extending rearwardly from the cab; said method comprising the steps of cutting away the bed for a predetermined distance back from the cab, mounting a floor in the cut-away area, mounting a preformed open-front and roofless body member on said floor with its forward side edges in engagement with the back of the cab adjacent the sides thereof, cutting out the back of the cab between the sides of the body portion and a major portion of the roof of the cab, securing the sides of the body member against the back of the cab in rigid relation therewith, and applying a single roof panel over the body member and cab in secured relation therewith.

References Cited in the file of this patent

UNITED STATES PATENTS

| 1,629,478 | Clark | May 24, 1927 |
| 1,926,350 | Olson | Sept. 12, 1933 |
| 2,120,918 | Larsen | June 14, 1938 |
| 2,426,772 | Hofan, Jr., et al. | Sept. 2, 1947 |
| 2,701,670 | Hutchinson | Feb. 8, 1955 |

FOREIGN PATENTS

| 365,929 | Great Britain | Jan. 28, 1932 |